March 9, 1965 W. WEGLIN 3,172,382
DESOLDER TOOL
Filed Dec. 20, 1962

INVENTOR.
WALTER WEGLIN
BY
ATTY'

United States Patent Office 3,172,382
Patented Mar. 9, 1965

3,172,382
DESOLDER TOOL
Walter Weglin, Seattle, Wash., assignor to The Boeing Company, Seattle, Wash., a corporation of Delaware
Filed Dec. 20, 1962, Ser. No. 246,107
2 Claims. (Cl. 113—59)

My invention relates to a desoldering tool applicable to existing soldering tools, the most adaptable being the pencil type using electrical energy for heating purposes, and being particularly designed for work on miniature electrical circuits where solder fillets and joints must be removed in reworking such circuits where faulty joints and electrical connections and components exist and must be repaired or replaced.

In the rework of electrical circuits, the removal of solder must be accomplished quickly and efficiently without damage to the circuits or their components.

Present methods and tools though capable of removing solder from a solder joint are not without objection as to the methods used, time required, the quality of desoldering and the overall efficiency and cost of the operation. The use of fluxed wire braid in conjunction with a soldering iron is time consuming as well as leaving a residue of flux at each desoldered joint. Many times circuit pads are pulled off circuit boards by attempting to remove the braid after the solder has solidified. Compressed air has been used to blow melted solder away from a joint but this results in an objectionable spraying of solder over adjoining areas and parts. Existing desolder tools which use various types of suction and vacuum creating devices for sucking melted solder from the desoldered areas into storage chambers have been found to be large, cumbersome, awkward to handle, inefficient, subject to constant repair and cleaning and in many cases needing the use of two hands to operate the device as well as considerable manual dexterity.

Therefore an object of this invention is to provide a tool that is simple, light, with a minimum of component parts and capable of being held like a pencil in one hand thus simplifying and reducing the amount of manual dexterity required but obtaining greater efficiency and ease of operation and a potential reduction in damage to objects being reworked.

A further object of this invention is to provide a tool that removes the melted solder through suction means but does not require a storage chamber for the removed solder, thus reducing the overall weight and complexity of the tool and eliminating the need to disassemble a hot tool to remove stored solder.

A further object of this invention is to provide a tool that is easily adapted for use in conjunction with existing soldering tools with little or no modification to the soldering tool required.

Other objects and a fuller understanding of this invention will become readily apparent from the accompanying description and drawing in which.

Figure 1:
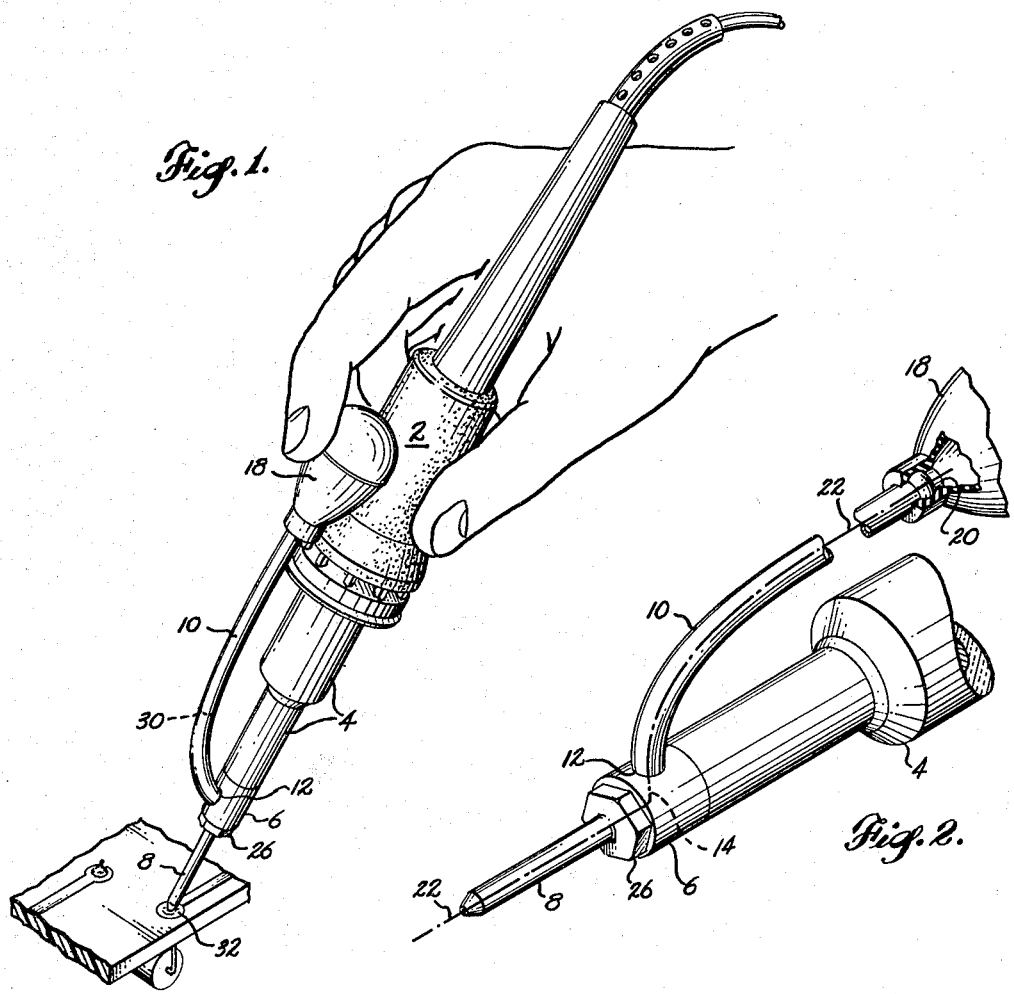
FIG. 1 is a perspective view of the device depicting its use in desoldering a solder joint.
Figure 2:
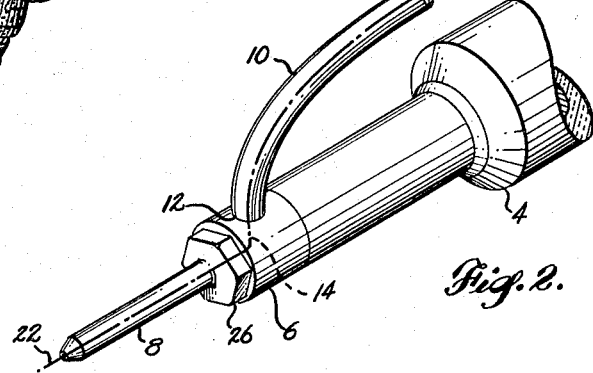
FIG. 2 is an enlarged perspective view of a portion of the device with the passageway from the tip to the bulb indicated.

Referring now to the drawing, the desoldering tool comprises generally a handle 2 which carries a replaceable heating unit 4, which handle and heating unit are commercially available as components of existing pencil type soldering irons, an adapter 6 which is carried by heating unit 4 and is disposed in a heat conductive relationship thereto, a replaceable hollow tip 8 which is carried by adapter 6 and is disposed in a heat conductive relationship thereto, a hollow tube 10 one end of which is affixed to adapter 6 at a point in the wall of adapter 6 where there is opening 12 which extends as passageway 14 through adapter 6 to opening 16 in the end of adapter 6 which carries tip 8 and tube 10 then curving and extending a predetermined distance in the direction of handle 2 where a small rubber bulb 18, having only one opening 20, is affixed to this end of tube 10 and whereby bulb 18 rests in a cooperative position against handle 2. There is thus created an unobstructed continuous passageway 22 through tip 8, adapter 6, tube 10 and into bulb 18 with heat being conducted from heating unit 4, when it is energized, through adapter 6 into tip 8 and into the tube 10 for a short distance from the point at which tube 10 is affixed to adapter 6.

Figure 3:
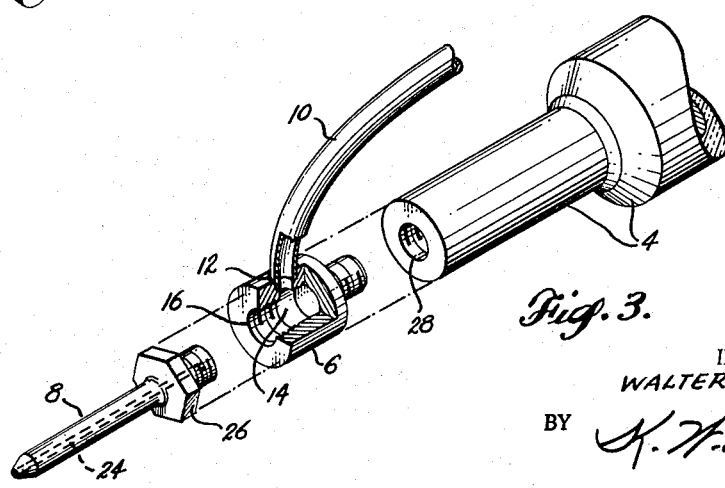
FIG. 3 is an enlarged exploded perspective view of a portion of the device with a partial section view of the adapter and tube.

In FIGURE 3 of the drawing, the hollow tip 8, as shown therein, is a commercially available cylindrically shaped copper soldering tip which has passageway 24 drilled through its center lengthwise from one end of the tip to the other end. One end of the tip 8 is conically shaped and the other end is threaded, with nut 26 threaded thereon an appropriate distance from the end, and such nut being permanently fixed in this position by brazing or other means.

Nut 26 functions as an adequate seal at the junction of tip 8 and adapter 6 and also enables the person using the desoldering tool to readily remove and replace a hot tip with another shaped tip through the use of an appropriately sized nut driver (not shown).

The outside diameter, inside diameter, shape and length of tip 8 will be dependent upon the size and position of the solder joints to be desoldered. Tip 8 may be tinned or metal plated dependent upon preference which will result from consideration of cost and service life of the tip and such tip may also be made from other metal material which has heat transferring capabilities.

Adapter 6, as shown in FIGURE 3 of the drawing, is made from a low carbon steel rod with the end which connects with heating unit 4 being machined to a lesser diameter and threaded for predetermined distance from such end so that adapter 6 may be joined to heating unit 4 by screwing said threaded end into a matching drilled and threaded opening 28 in the end of heating unit 4.

Commencing at opening 16 in adapter 6, passageway 14 is threaded inward for a sufficient distance to accommodate tip 8 when such is screwed in place.

The exterior surface of adapter 6 is metal plated with chrome or other suitable metal material to reduce heat loss through radiation.

The assembly of tip 8, heating unit 4 and adapter 6 by screwing them together is a preferred method of assembly, however, it is recognized that suitable slip joints could be fashioned which could accomplish the same result.

Tube 10 is fashioned from a suitably sized stainless steel tube and is appropriately curved as shown in FIGURE 1 so that when bulb 18, when attached to it, will rest against handle 2. One end of tube 10 is inserted in adapter 6 at opening 12 and is permanently fixed by brazing or other suitable means. Stainless steel was chosen as the preferred material for tube 10 because of its slow heat transferring capabilities in order to limit the amount of heat being transferred to bulb 18. However, because the melted solder being sucked into tip 8 and part way into tube 10 must remain fluid and not solidify, sufficient heat has to be retained in tube 10 at this point. Tests showed that plating the exterior of tube 10 with chrome or other suitable metal material for a predetermined distance from opening 12 towards bulb 18 had the effect of reducing heat radiation in this area sufficiently so that the temperature in passageway 22 at this point remained sufficiently high to retain melted solder contained in tube 10 in a fluid state.

Rubber was found to be the most suitable material from which to fashion bulb 18, although other material could be used. The single opening 20 in bulb 18 is sized to fit over tube 10. There is a direct relationship between the size of bulb 18 and the diameter of passageway 24 in tip 8. The amount of suction created by releasing bulb 18 after it is depressed should be great enough to only draw the melted solder part way into passageway 22 and not past point 30 which is the point on tube 10 where the metal plating, which extends from opening 12 towards bulb 18, ceases. Any greater suction which would cause the melted solder to be drawn past point 30 was found to be undesirable in that it would tend to permit melted solder to solidify in the cooler areas of tube 10 and thus obstruct passageway 22. It was also found that the reduced size of bulb 18 permitted the desoldering tool to be more easily used and manipulated by one hand.

In operation, the desoldering tool is held like a pencil in one hand with the forefinger resting on bulb 18. After heating unit 4 has been energized and sufficient heat conducted to tip 8, bulb 18 is depressed, by the forefinger, against handle 2 thus exhausting air in bulb 18 out through tip 8. The desoldering tool is then manipulated by hand so that tip 8 is gently pressed against or along side solder joint 32 which is to be desoldered. The heat conducted from tip 8 melts the solder whereupon the forefinger is abruptly raised releasing the pressure on bulb 18 causing a vacuum to be created which results in the melted solder to be sucked or drawn into tip 8 and a part way into tube 10. The desoldering tool is then manipulated by hand so that tip 8 is in a position over or pointing into a convenient open receptacle (not shown) whereupon bulb 18 is depressed, by the forefinger, against handle 2 thus creating a flow of air from bulb 18 through passageway 22 causing the melted solder contained in tube 10 to be expelled out through tip 8 into said receptacle. It is recognized that said receptacle is not required in the operation of the desoldering tool, however, where shop and area cleanliness is necessary, it would be most desirable to have such receptacle available.

While the desoldering tool of the invention as illustrated and described is particularly adapted for a desoldering operation, it can also be used for soldering and because of its small and light weight construction it is especially adaptable for soldering miniature electrical circuits, and, while a particular preferred embodiment has been specifically disclosed, it is understood that the invention is not limited thereto, as many variations will be readily apparent to those skilled in the art and the invention is to be given its broadest possible interpretation within the spirit and scope of what is described and claimed.

What I claim is:

1. A tool for melting and removing fusible material comprising a handle; heating means carried by said handle; a metal adapter carried by said heating means and disposed in a heat conductive relationship to said heating means, said adapter having a passageway with an opening at the end opposite the end carried by said heating means and the passageway extending part way through said adapter and out through an opening in the side wall of said adapter at a predetermined distance from said end with an opening; a soldering tip carried by said adapter and disposed in a heat conductive relationship to said adapter, said tip having a passageway extending through the length of said tip with openings at each end of said tip, said tip being disposed so that the passageway in said tip is in communication with the passageway in said adapter; a hollow metal tube disposed in a fixed and heat conductive relationship with respect to said adapter at the passageway opening in the wall of said adapter and extending and disposed in a direction towards said handle, said tube having a passageway capable of permitting the flow of fluid fusible material through the length of said tube, with openings at each end of said tube, said tube being disposed so that the passageway in said tube is in communication with the passageway in said adapter; a small hollow rubber bulb having only one opening, which opening is so sized as to permit said bulb to fit over the end of said tube furthest from said adapter, which end of said tube is provided with means to hold and retain said bulb so that the hollow interior of said bulb is in communication with the passageway in said tube, said bulb being so sized and the diameter of the passageway in said tip being such that the vacuum suction capabilities of said bulb will be no greater than that necessary to draw fusible material through the passageways of said tip and said adapter and only part way into the passageway of said tube; whereby the tool has a clear and unimpeded passageway extending from the open end of said tip furthest from said bulb through said tip and through said adapter and through said tube into said bulb thus permitting air to be exhausted from said bulb through said unimpeded passageway when the bulb is squeezed and a reverse vacuum suction action to be created through said unimpeded passageway when the pressure applied to said bulb by said squeezing action is released.

2. A tool as claimed in claim 1 in which the outside surface of said tube along a partial length of said tube is plated with a metal coating which possesses low heat transferring capabilities, said length commencing at the point where said tube is disposed in fixed relationship with respect to said adapter and extending towards said bulb at least as far as the maximum distance that the fusible material is drawn into said tube by said bulb, so that the radiation of heat from said tube in the area that is plated is reduced, thus enabling the fusible material, which can be sucked into said tube, to remain in a fluid state in close proximity to said tip and be capable of being ejected out of said tube and through said tip.

References Cited by the Examiner

UNITED STATES PATENTS

| 571,970 | 11/96 | Harvey | 128—401 X |
| 944,254 | 12/09 | Binford | 32—70 |
| 1,724,070 | 8/29 | Byrne. | |
| 2,609,778 | 9/52 | Bleam et al. | 219—230 X |

FOREIGN PATENTS

| 181,042 | 6/22 | Great Britain. |
| 693,197 | 6/53 | Great Britain. |
| 875,398 | 8/61 | Great Britain. |

RICHARD M. WOOD, *Primary Examiner.*

ANTHONY BARTIS, *Examiner.*